(12) United States Patent
Nishida et al.

(10) Patent No.: US 8,313,865 B2
(45) Date of Patent: *Nov. 20, 2012

(54) SEPARATOR

(75) Inventors: Yasunori Nishida, Tsukuba (JP); Yasuo Shinohara, Tsuchiura (JP); Hiroyuki Sato, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 12/532,363

(22) PCT Filed: Mar. 19, 2008

(86) PCT No.: PCT/JP2008/055807
§ 371 (c)(1),
(2), (4) Date: Nov. 24, 2009

(87) PCT Pub. No.: WO2008/123331
PCT Pub. Date: Oct. 16, 2008

(65) Prior Publication Data
US 2010/0112432 A1 May 6, 2010

(30) Foreign Application Priority Data

Mar. 23, 2007 (JP) ................. 2007-076415

(51) Int. Cl.
H01M 10/0583 (2010.01)
H01M 10/0587 (2010.01)
H01M 2/14 (2006.01)
H01M 2/16 (2006.01)
B32B 5/22 (2006.01)
C08J 9/00 (2006.01)

(52) U.S. Cl. ............ 429/251; 429/246; 428/317.9; 521/50

(58) Field of Classification Search .......... 428/220, 428/317.9; 429/129, 246, 251; 521/50
See application file for complete search history.

(56) References Cited

U.S. PATENT DOCUMENTS

| | | | |
|---|---|---|---|
| 5,683,634 A | 11/1997 | Fujii et al. | |
| 5,691,047 A | 11/1997 | Kurauchi et al. | |
| 6,447,958 B1 | 9/2002 | Shinohara et al. | |
| 7,063,914 B2 * | 6/2006 | Kawano et al. | 429/508 |
| 2005/0214637 A1 | 9/2005 | Imachi et al. | |
| 2005/0221192 A1 | 10/2005 | Hennige et al. | |
| 2006/0019154 A1 | 1/2006 | Imachi et al. | |
| 2006/0216608 A1 * | 9/2006 | Ohata et al. | 429/246 |
| 2007/0281206 A1 * | 12/2007 | Fujikawa et al. | 429/62 |
| 2008/0038631 A1 * | 2/2008 | Nakura et al. | 429/144 |

FOREIGN PATENT DOCUMENTS

| | | |
|---|---|---|
| CN | 1685539 A | 10/2005 |
| CN | 1795578 A | 6/2006 |
| EP | 1889867 A1 | 2/2008 |
| JP | 5-82171 A | 4/1993 |
| JP | 7-29563 A | 1/1995 |
| JP | 7-289864 A | 11/1995 |
| JP | 7-304110 A | 11/1995 |
| JP | 8-311233 A | 11/1996 |
| JP | 11-144697 * | 5/1999 |
| JP | 2000-30686 A | 1/2000 |
| JP | 2000-106327 A | 4/2000 |
| JP | 2001-023602 A | 1/2001 |
| JP | 2001-206972 A | 7/2001 |
| JP | 2001-316006 A | 11/2001 |
| JP | 2001-342282 A | 12/2001 |
| JP | 2003-165863 A | 6/2003 |
| JP | 2003-318331 A | 11/2003 |
| JP | 2004-327183 A | 11/2004 |
| JP | 2005-258385 A | 10/2005 |
| JP | 2005-294139 A | 10/2005 |
| JP | 2005-336367 A | 12/2005 |
| JP | 2006-32246 A | 2/2006 |
| JP | 2006-066355 A | 3/2006 |
| JP | 2006-88426 A | 4/2006 |
| JP | 2006-307163 A | 11/2006 |
| JP | 2006-348280 A | 12/2006 |
| JP | 2007-95575 A | 4/2007 |
| WO | 2006/064775 A1 | 6/2006 |
| WO | WO 2006064775 A1 * | 6/2006 |

OTHER PUBLICATIONS

U.S. Appl. No. 12/532,315, filed Nov. 23, 2009 to Nishida et al.
U.S. Appl. No. 12/593,258, filed Sep. 25, 2009 to Kumamoto.
U.S. Appl. No. 12/528,565, filed Aug. 25, 2009, to Nishida et al.
U.S. Appl. No. 12/600,227, filed Feb. 23, 2010 to Sato.
U.S. Appl. No. 12/600,176, filed Nov. 13, 2009 to Sato.
U.S. Appl. No. 12/600,200, filed Nov. 13, 2009 to Sato.
Notice of Reasons for Allowance, dispatched Jul. 31, 2012 from the Japanese Patent Office, in co-pending Japanese Patent Application No. 2008-062268, along with an English translation thereof.

* cited by examiner

*Primary Examiner* — Randy Gulakowski
*Assistant Examiner* — Kara Boyle
(74) *Attorney, Agent, or Firm* — Sughrue Mion, PLLC

(57) ABSTRACT

Provided is a separator made of a laminated porous film in which a heat-resistant layer that comprises a heat-resistant resin and a shut-down layer that comprises a thermoplastic resin are laminated, wherein the heat-resistant layer further comprises two or more fillers, and the value of $D_2/D_1$ is 0.15 or less where among values each obtained by measuring the average particle diameter of particles that constitute one of the two or more fillers, the largest value is let be $D_1$ and the second largest value is let be $D_2$.

14 Claims, No Drawings

SEPARATOR

FIELD OF THE INVENTION

The present invention relates to a separator, and more particularly to a separator for a non-aqueous electrolyte secondary battery.

BACKGROUND ART

A separator comprises a porous film having micropores, and it is used for a non-aqueous electrolyte secondary battery such as a lithium ion secondary battery and a lithium polymer secondary battery. In the non-aqueous electrolyte secondary battery, it is important to interrupt an electric current and prevent excessive flow of the electric current (shutdown), when an abnormal current flows in the battery due to an electrical short circuit between a cathode and an anode. Therefore, the separator is required to shut-down the current (to plug the micropores of the porous film) at a temperature as low as possible, when the temperature rises exceeding a normal operating temperature, and even if the temperature inside the battery rises to a certain high temperature after the current is shut-down, not to break the film due to the high temperature and to maintain the shut-down state as it is, in other words, to have high heat-resistance.

Examples of conventional separators include a separator made of a laminated porous film in which a polyolefin layer and a heat-resistant layer are laminated. As a specific example of such a separator, JP-A-2005-285385 and JP-A-2006-032246 describe a separator produced by coating one side of a polyethylene film with a solution prepared by dissolving a polyamide as a heat-resistant material in N-methyl-2-pyrrolidone as a water-soluble solvent, then immersing the coated polyethylene film in water to remove N-methyl-2-pyrrolidone and to deposit and coagulate the polyamide, and drying the film.

SUMMARY OF INVENTION

Although the separator produced as described above has few defects in gas permeability, a non-aqueous electrolyte secondary battery comprising such a separator has an insufficient high-current discharge characteristic (rate characteristic).

An object of the present invention is to provide a separator which has high heat-resistance and also which can increase the high-current discharge characteristic (rate characteristic) of the battery when used in a non-aqueous electrolyte secondary battery.

In order to solve the above problem, the present inventors have conducted earnest studies. As a result, they have completed the present invention. That is, the present application provides the following inventions:

<1> A separator made of a laminated porous film in which a heat-resistant layer that comprises a heat-resistant resin and a shut-down layer that comprises a thermoplastic resin are laminated,
wherein
the heat-resistant layer further comprises two or more fillers, and the value of $D_2/D_1$ is 0.15 or less
where among values each obtained by measuring the average particle diameter of particles that constitute one of the two or more fillers, the largest value is let be $D_1$ and the second largest value is let be $D_2$.

<2> The separator of <1>, wherein the heat-resistant layer has a thickness of not less than 1 μm and not more than 10 μm.

<3> The separator of <1> or <2>, wherein when the weight of all the fillers is let be 100, the weight of the filler that is constituted of the particles having an average particle size of $D_1$ and the weight of the filler that is constituted of the particles having an average particle size of $D_2$ is 90 or more.

<4> The separator of any one of <1> to <3>, wherein $D_1$ is not less than 0.1 μm, and $D_2$ is less than 0.1 μm.

<5> The separator of any one of <1> to <4>, wherein $D_1$ is not more than 10 μm.

<6> The separator of <4> or <5>, wherein $D_1$ is not less than 0.1 μm and not more than 1 μm, and $D_2$ is not less than 0.01 μm and less than 0.1 μm.

<7> The separator of any one of <1> to <6>, wherein all the particles constituting the fillers are alumina particles.

<8> The separator of any one of <1> to <7>, wherein a part or all of the particles constituting the fillers are approximately spherical particles.

<9> The separator of <7> or <8>, wherein when the overall weight of the heat-resistant layer is let be 100, the weight of the fillers is not less than 20 and not more than 95.

<10> The separator of any one of <1> to <9>, wherein when the thickness of the heat-resistant layer is let be A (μm) and the thickness of the shut-down layer is let be B (μm), the ratio of A/B is not less than 0.1 and not more than 1.

<11> The separator of any one of <1> to <10>, wherein the heat-resistant resin is a nitrogen-containing aromatic polymer.

<12> The separator of any one of <1> to <11>, wherein the thermoplastic resin is polyethylene.

<13> The separator of any one of <1> to <12>, wherein the heat-resistant layers are provided on the both faces of the shut-down layer.

According to the present invention, it is possible to provide a separator which has high heat-resistance and can improve a high-current discharge characteristic (rate characteristic) of a battery when it is used in a non-aqueous electrolyte secondary battery. Furthermore, because of excellent rate characteristic, the separator is very suitable, in particular, for a non-aqueous electrolyte secondary battery which is required to have a high energy output at a high electric current, specifically, a non-aqueous electrolyte secondary battery for an automobile or a power tool in an electric tool. In addition, the separator of the invention can satisfactorily be used for a capacitor. Accordingly, the present invention is industrially very useful.

EMBODIMENTS OF THE INVENTION

The present invention provides a separator comprising a laminated porous film in which a heat-resistant layer containing a heat-resistant resin and a shut-down layer containing a thermoplastic resin are laminated, wherein the heat-resistant layer further contains at least two fillers, and a ratio of $D_2/D_1$ is 0.15 or less in which $D_1$ is the largest average particle size and $D_2$ is the second largest average particle size among average particle sizes obtained by measuring an average size of particles constituting each of the filler. In the present invention, because of such a structure of the porous film, relatively small micropores and relatively large micropores are formed in a balanced manner among the micropores in the heat-resistant layer of the separator. The present inventors may assume that the structure of the micropores having a relatively small particle size may improve the heat-resistance of the separator, while the structure of the micropores having a relatively large particle size may improve the ion permeability, and therefore, the rate characteristic of a non-aqueous electrolyte secondary battery may be improved when the separator is used in the battery.

In the present invention, the separator includes the thin heat-resistant layer having a thickness of not less than 1 μm and not more than 10 μm, further not less than 1 μm and not more than 5 μm, particularly not less than 1 μm and not more than 4 μm. Thus, the ion permeability can be increased.

The micropores in the heat-resistant layer of the present invention have a size (a diameter) of usually 3 μm or less, preferably 1 μm or less. The pore size can be controlled by suitably selecting average particle sizes and materials of the fillers used, and a filler content in the heat-resistant layer. In the present invention, it is favorable that the relatively small micropores have a pore size of less than 0.1 μm, and the relatively small micropores have a pore size of not less than 0.1μ and not more than 1 μm. Also, in the present invention, the porous film usually has a porosity of usually 30 to 80% by volume, and preferably 40 to 70% by volume.

The present invention provides a separator comprising a laminated porous film in which a heat-resistant layer containing a heat-resistant resin and a shut-down layer containing a thermoplastic resin are laminated, wherein the heat-resistant layer further contains at least two fillers, and a ratio of $D_2/D_1$ is 0.15 or less in which $D_1$ is the largest average particle size and $D_2$ is the second largest average particle size among average particle sizes obtained by measuring an average size of particles constituting each of the filler. In the present invention, an average particle size is a value obtained by measuring the particle sizes in a scanning electron micrograph. That is, particles (filler particles) taken in a scanning electron micrograph of a surface or a cross section of a heat-resistant layer of a separator are classified according to particle sizes, and when the largest average particle size is defined as $D_1$ and the second largest average particle size is defined as $D_2$ among the average particle sizes of the classes, a ratio of $D_2/D_1$ is 0.15 or less. In the present invention, the average particle size is obtained by arbitrarily selecting 25 particles in each class, measuring the particle size (diameter) of each particle, and averaging the particle sizes of the 25 particles. In the present invention, the particles constituting the fillers mean primary particles constituting the fillers.

When the separator of the present invention is produced, a scanning electron micrograph of each of the two or more fillers to be used is taken, 25 particles are arbitrarily selected from the particles taken in the micrograph, particle sizes of the 25 particles are measured and averaged, and the averaged value is used as an average particle size. When the largest average particle size is defined as $D_1$ and the second largest average particle size is defined as $D_2$ among the average particle sizes of the fillers, a ratio of $D_2/D_1$ is 0.15 or less. That is, the present invention provides a separator comprising a laminated porous film in which a heat-resistant layer containing a heat-resistant resin and a shut-down layer containing a thermoplastic resin are laminated, wherein the heat-resistant layer further contains at least two fillers, and a ratio of $D_2/D_1$ is 0.15 or less in which $D_1$ is the largest average particle size and $D_2$ is the second largest average particle size among average particle sizes obtained by measuring an average size of particles constituting each of the filler.

In the present invention, with respect to the filler consisting of the particles having the average particle size of $D_1$, the particle sizes of all of the particles are preferably within a range of 0.5 to 2 times $D_1$, more preferably within a range of 0.7 to 1.5 times $D_1$, still more preferably within a range of 0.8 to 1.2 times $D_1$. A narrower particle size distribution is better. With respect to the filler consisting of the particles having the average particle size of $D_2$, the particle sizes of all of the particles are preferably within a range of 0.5 to 2 times $D_2$, more preferably within a range of 0.7 to 1.5 times $D_2$, still more preferably within a range of 0.8 to 1.2 times $D_2$. A narrower particle size distribution is better. The effects of the present invention can be further improved by the above particle size distributions.

When the ratio of $D_2/D_1$ in the present invention is 0.10 or less, the effects of the present invention tend to be further improved. Also, in the present invention, the total weight of the filler consisting of the particles with the average particle size of $D_1$ and the filler consisting of the particles with the average particle size of $D_2$ are preferably at least 90, more preferably at least 95, and still more preferably at least 99, when the whole weight of all the fillers is let be 100. Accordingly, the effects of the present invention are further improved.

The weight of the filler consisting of the particles with the average particle size of $D_1$ is preferably at least 10, more preferably at least 30, when the whole weight of all the fillers is let be 100. Also, the weight of the filler consisting of the particles with the average particle size of $D_2$ is preferably at least 10, more preferably at least 30, when the whole weight of all the fillers is let be 100. More preferably, the ratio of the weight of the filler consisting of the particles with the average particle size of $D_1$ to the weight of the filler consisting of the particles with the average particle size of $D_2$ is from 30:70 to 70:30, when the whole weight of the fillers is let be 100.

In the present invention, $D_1$ is preferably 10 μm or less, from the viewpoint of increasing the electric capacity of a battery. Preferably, $D_1$ is not less than 0.1 μm and $D_2$ is less than 0.1 μm. More preferably, $D_1$ is not less than 0.1 μm and not more than 1 μm, and $D_2$ is not less than 0.01 μm and less than 0.1 μm. The effects of the present invention are further improved when $D_1$ and $D_2$ are set in these ranges.

In the present invention, examples of the heat-resistant resin include polyamides, polyimides, polyamideimides, polycarbonates, polyacetals, polysulfones, polyphenylene sulfides, polyether ether ketones, aromatic polyesters, polyether sulfones, and polyetherimides. In view of further improvement of the heat resistance, polyamides, polyimides, polyamideimides, polyether sulfones and polyetherimides are preferable, and polyamides, polyimides and polyamideimides are more preferable. Nitrogen-containing aromatic polymers such as aromatic polyamides (para-oriented aromatic polyamides and meta-oriented aromatic polyamides), aromatic polyimides and aromatic polyamideimides are still more preferable, and aromatic polyamides are especially preferable. In view of production easiness, para-oriented aromatic polyamides (hereinafter sometimes referred to as "para-aramids") are particularly preferable. In addition, the heat-resistant resin may also include poly-4-methylpentene-1, and cyclic olefin polymers.

In the separator of the present invention, the heat resistance can be improved, in other words, the temperature at which the film is thermally damaged, can be raised by the use of the heat-resistant resin as described above. The temperature at which the film is thermally damaged is usually 160° C. or more, though it depends on the kind of the heat-resistant resin. When the nitrogen-containing aromatic polymer as described above is used as the heat-resistant resin, the temperature at which the film is thermally damaged can be raised up to about 400° C. When poly-4-methylpentene-1 and the cyclic olefin polymer are used, the temperature at which the film is thermally damaged can be elevated up to about 250° C. and up to about 300° C., respectively.

The para-aramid is produced by condensation polymerization of a para-oriented aromatic diamine and a halide of a para-oriented aromatic dicarboxylic acid, and it substantially comprises repeating units in which amide bonds are bonded at the para-positions of the aromatic ring or at orientation positions analogous to the para-positions (for example, orientation positions extending along the same axis or in parallel in opposite directions, such as those found in 4,4'-biphenylene, 1,5-naphthalene, and 2,6-naphthalene). Specifically, the para-oriented para-aramids or para-aramids having the orientation analogous to the para-oriented para-aramids such as poly(para-phenylene terephthalamide), poly(para-benzamide), poly(4,4'-benzanilideterephthalamide), poly(para-phenylene-4,4'-biphenylene dicarboxylic acid amide), poly (para-phenylene-2,6-naphthalene dicarboxylic acid amide), poly(2-chloro-para-phenylene terephthalamide), and para-phenylene terephthalamide/2,6-dichloro-para-phenylene terephthalamide copolymers can be exemplified.

Among the aromatic polyimides described above, wholly aromatic polyimides produced by condensation polymerization of an aromatic acid dianhydride with a diamine are preferable. Specific examples of the aromatic acid dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl) hexafluoropropane, and 3,3',4,4'-biphenyl tetracarboxylic dianhydride. Specific examples of the diamine include, but not limited to, oxydianiline, para-phenylenediamine, benzophenonediamine, 3,3'-methylenedianiline, 3,3'-diaminobenzophenone, 3,3'-diaminodiphenylsulfone, and 1,5'-naphthalene diamine. In the present invention, solvent-soluble polyimides are preferably used. Examples of the polyimides include polycondensate polyimides of 3,3',4,4'-diphenylsulfonetetracarboxylic dianhydride with an aromatic diamine.

Examples of the aromatic polyamideimides include products prepared by condensation polymerization using an aromatic dicarboxylic acid with an aromatic diisocyanate, and products prepared by condensation polymerization of an aromatic acid dianhydride with an aromatic diisocyanate. Specific examples of the aromatic dicarboxylic acid include isophthalic acid and terephthalic acid. Specific examples of the aromatic acid dianhydride include trimellitic anhydride. Specific examples of the aromatic diisocyanate include 4,4'-diphenylmethanediisocyanate, 2,4-tolylenediisocyanate, 2,6-tolylenediisocyanate, ortho-tolylenediisocyanate, and m-xylenediisocyanate.

In the present invention, the shut-down layer comprises a thermoplastic resin. The shut-down layer has micropores, like the heat-resistant layer described above does, and the pore size is usually 3 μm or less, preferably 1 μm or less. The shut-down layer usually has a porosity of not less than 30% and not more than 80% by volume, preferably not less than 40% and not more than 70% by volume. The shut-down layer acts to block the micropores by the softening of the thermoplastic resin constituting the layer, when a temperature rises above a normal operating temperature in a non-aqueous electrolyte secondary battery.

In the present invention, as the thermoplastic resin, those which soften at a temperature of not less than 80° C. and not more than 180° C. can be used, and those which are not dissolved in an electrolyte of the non-aqueous electrolyte secondary battery may be selected. Specific examples of such resins include polyolefins such as polyethylene and polypropylene, and thermoplastic polyurethanes. They may be used as a mixture of two or more of them. The polyethylenes are preferable, because they soften at a relatively low temperature to induce shutdown. Specific examples of the polyethylenes include low-density polyethylenes, high-density polyethylenes and linear polyethylenes, as well as ultrahigh molecular weight polyethylenes. The thermoplastic resins preferably contain at least ultrahigh molecular weight polyethylene, since the piercing strength of the shut-down layer can be further improved. In some cases, the thermoplastic resins preferably contain a wax composed of a polyolefin with a low molecular weight (a weight average molecular weight of 10,000 or less) from the viewpoint of the easy production of the shut-down layer.

In the present invention, the shut-down layer usually has a thickness of not less than 3 μm and not more than 30 μm, preferably not less than 5 μm and not more than 20 μm. The separator of the present invention comprises the heat-resistant layer and the shut-down layer which are laminated each other, and the separator has a thickness of usually 20 μm or less, preferably 10 μm or less. The ratio of the thickness A (μm) of the heat-resistant layer to the thickness B (μm) of the shut-down layer, that is, A/B is preferably not less than 0.1 and not more than 1.

Hereinafter, the filler used in the present invention will be explained. In the present invention, any material selected from organic powders, inorganic powders and mixtures thereof may be used for the filler.

Examples of the organic powder described above include powders made of organic substances, for example, homopolymers of styrene, vinyl ketone, acrylonitrile, methyl methacrylate, ethyl methacrylate, glycidyl methacrylate, glycidyl acrylate or methyl acrylate, or copolymers of two or more monomers; fluororesins such as polytetrafluoroethylene, tetrafluoroethylene-hexafluoropropylene copolymers, tetrafluoroethylene-ethylene copolymers and polyvinylidene fluoride; melamine resins; urea resins; polyolefins; and polymethacrylates. The organic powder may be used alone or as a mixture of two or more of them. Among these organic powders, the polytetrafluoroethylene powder is preferable because of the chemical stability thereof.

Examples of the inorganic powder as described above include powders made of inorganic substances, for example, metal oxides, metal nitrides, metal carbides, metal hydroxides, carbonates, and sulfates, and specifically includes particles made of alumina, silica, titanium dioxide, or calcium carbonate. The inorganic powder may be used alone or as a mixture of two or more of them. Among these inorganic powders, the alumina powder is preferable because of the chemical stability thereof. Herein, preferably, all particles constituting the fillers are alumina particles. More preferably, all particles constituting the fillers are alumina particles, and a part or all of the particles are substantially spherical alumina particles. In the present invention, the substantially spherical alumina particles encompass completely spherical particles.

In the present invention, a filler content in the heat-resistant layer depends on the materials of the fillers. Usually, the weight of the fillers is not less than 5 and not more than 95, when the whole weight of the heat-resistant layer is let be 100. For example, when all of the particles constituting the fillers are alumina particles, the weight of the fillers is usually not less than 20 and not more than 95, when the whole weight of the heat-resistant layer is let be 100, preferably not less than 30% by weight and not more than 90% by weight. These ranges can be suitably selected according to the specific gravities of the materials of the fillers.

The shape of the filler particles used in the present invention may include substantially spherical, plate, cylindrical, needle, whisker and fiber shapes, and particles with either shape may be used. The substantially spherical particles are preferable, because they easily form uniform pores. Particles having an aspect ratio (a ratio of major axis length to minor axis length) within a range of not less than 1 and not more than 1.5 are included in the substantially spherical particles. The aspect ratio of the particles can be determined by observing electron micrograph.

In the present invention, among the combinations of the resin and the fillers described above, a combination in which a para-oriented aromatic polyamide is used as the heat-resistant resin, and a filler consisting of particles with an average particle size of $D_1$ which is not less than 0.1 µm and not more than 1 µm, and a filler consisting of particles with an average particle size of $D_2$ which is not less than 0.01 µm and less than 0.1 µm are used as the fillers, with all of the fillers consisting of substantially spherical alumina particles is particularly preferable.

From the viewpoint of ion permeability, the separator of the present invention preferably has a gas permeability of not less than 50 sec./100 cc and not more than 300 sec./100 cc, more preferably not less than 50 sec./100 cc and not more than 200 sec./100 cc, when measured by a Gurley method.

The separator of the present invention is particularly useful as a separator for a non-aqueous electrolyte secondary battery such as a lithium ion secondary battery and a lithium polymer secondary battery. In addition, it can also be used for an aqueous electrolyte secondary battery, a non-aqueous electrolyte primary battery, or a capacitor.

Here, a method for producing the separator of the present invention will be described.

Firstly, a method for producing a shut-down layer will be outlined. A method for producing the shut-down layer of the present invention is not particularly limited, and includes a method wherein a film composed of a thermoplastic resin produced by a known method, such as a method comprising the steps of forming a film from a thermoplastic resin to which a plasticizer has been added, and then removing the plasticizer from the film with an adequate solvent, as described in JP-A-7-29563, or a method comprising the steps of providing a film of a thermoplastic resin which has been produced by a conventional process, and selectively drawing structurally weak amorphous parts of the film to form micropores, as described in JP-A-7-304110. When the shut-down layer of the present invention comprises a polyolefin resin containing an ultrahigh molecular weight polyethylene and a low molecular weight polyolefin having a weight average molecular weight of 10,000 or less, the layer is produced preferably by the following method, from the viewpoint of the production cost: a method comprising the following steps:

(1) preparing a polyolefin resin composition by kneading 100 parts by weight of an ultrahigh molecular weight polyethylene, 5 to 200 parts by weight of a low molecular weight polyolefin having a weight average molecular weight of 10,000 or less, and 100 to 400 parts by weight of an inorganic filler;
(2) molding the polyolefin resin composition prepared in step (1) to form a sheet;
(3) removing the inorganic filler from the sheet obtained in step (2); and
(4) drawing the sheet obtained in the step (3) to form a shut-down layer, or a method comprising the steps of
(1) preparing a polyolefin resin composition by kneading 100 parts by weight of an ultrahigh molecular weight polyethylene, 5 to 200 parts by weight of a low molecular weight polyolefin having a weight average molecular weight of 10,000 or less, and 100 to 400 parts by weight of an inorganic filler;
(2) molding the polyolefin resin composition prepared in step (1) to form a sheet;
(3) drawing the sheet obtained in step (2); and
(4) removing the inorganic filler from the drawn sheet obtained in step (3) to form a shut-down layer.

The former method in which the resulting sheet is drawn after the inorganic filler is removed from the sheet is preferable, because the shut-down temperature of the separator of the present invention in which the resulting shut-down layer and a heat-resistant layer are laminated can be made lower.

The inorganic filler has an average particle diameter (diameter) of preferably 0.5 µm or less, more preferably 0.2 µm or less, from the viewpoints of strength and ion permeability of the shut-down layer. Here, the average particle diameter of the filler is a value measured by a scanning electron microscopy. Specifically, 50 inorganic filler particles are randomly selected from a microphotograph of the filler particles, the particle diameter of each particle is measured, and the particle diameters of the 50 particles are averaged and used as a number average particle diameter of the filler particles.

Examples of the inorganic fillers include calcium carbonate, magnesium carbonate, barium carbonate, zinc oxide, calcium oxide, aluminum hydroxide, magnesium hydroxide, calcium hydroxide, calcium sulfate, silicic acid, zinc oxide, calcium chloride, sodium chloride and magnesium sulfate. These inorganic fillers can be removed from a sheet or film with an acid or alkali solution. In the present invention, it is preferable to use calcium carbonate, because particles having a very small particle diameter can be easily obtained.

A method for producing the polyolefin resin composition is not particularly limited. Materials for forming a polyolefin resin composition such as a polyolefin resin and an inorganic filler are mixed with a mixing apparatus such as a roll, a Banbury mixer, a single screw extruder or a twin screw extruder to give a polyolefin resin composition. When the materials are mixed, additives such as fatty acid esters, stabilizers, anti-oxidants, UV absorbers, and flame retardants may optionally be added thereto.

A method for forming a sheet from the polyolefin resin composition is not particularly limited, and the sheet can be produced by a sheet forming method such as inflation molding, calendering, T-die extrusion or scaifing. The sheet is preferably formed by the following method, because a sheet having high precision in the film thickness can be obtained.

In a preferable method for producing a sheet from a polyolefin resin composition, a polyolefin resin composition is roll-formed using a pair of rotational molding tools, the surface temperature of which is adjusted to a temperature higher than the melting point of a polyolefin resin contained in the polyolefin resin composition. The surface temperatures of the rotational molding tools are preferably a temperature of (the melting point +5)° C. or higher. The upper limit of the surface temperature is preferably a temperature of (the melting point +30)° C. or lower, more preferably (the melting point +20)° C. or lower. Rolls and belts are exemplified as a pair of rotational molding tools. The circumferential speeds of the pair of rotational molding tools are not necessarily the same, and the difference between them may be within a range of about ±5%. When a shut-down layer is formed using the sheet obtained by such a method, a shut-down layer excellent in strength, ion permeability and gas permeability can be obtained. A laminate of the single layer sheets obtained by the above-mentioned method may be used for producing the shut-down layer.

When the polyolefin resin composition is roll-molded with a pair of rotating molding tools, a strand of the polyolefin resin composition extruded from an extruder may be introduced into a gap between a pair of rotating molding tools, or may be formed into pellets of the polyolefin resin composition and then the pellets may be used.

When the sheet of the polyolefin resin composition or the sheet of the polyolefin resin composition from which the inorganic filler is removed is drawn, a tenter, a roll or an autograph may be used. The draw ratio is preferably from 2 to 12, more preferably from 4 to 10, in view of gas permeability. The sheet is usually drawn at a temperature of not lower than the softening point of a polyolefin resin and not exceeding the melting point thereof. The drawing temperature is preferably from 80 to 115° C. When the drawing temperature is too low, the sheet is easily damaged upon drawing. When it is too high, the gas permeability or the ion permeability of the resulting film sometimes lowers. The sheet is preferably heat-set after drawing. The heat-set temperature is preferably a temperature lower than the melting point of a polyolefin resin.

According to the present invention, the shut-down layer containing the thermoplastic resin prepared by the above method, and the heat-resistant layer are laminated to form a laminated porous film, and the separator is obtained therefrom. The heat-resistant layer may be provided on one side or both sides of the shut-down layer.

Examples of a method for laminating the shut-down layer and the heat-resistant layer include a method comprising the steps of separately producing a heat-resistant layer and a shut-down layer and laminating them, a method comprising coating at least one side of a shut-down layer with a coating liquid comprising a heat-resistant resin and a filler to form a heat-resistant layer, and the like. In the present invention, the latter method is preferable, in view of the formation of a relatively thin heat-resistant layer and the productivity. A specific embodiment of the method comprising coating at least one side of a shut-down layer with a coating liquid comprising a heat-resistant resin and a filler to form a heat-resistant layer comprises the following steps of:

(a) preparing a slurry coating liquid in which 1 to 1,500 parts by weight, based on 100 parts by weight of the heat-resistant resin, of the filler is dispersed in a polar organic solvent solution containing 100 parts by weight of the heat-resistant resin;
(b) coating at least one side of the shut-down layer with the coating liquid to form a coating film; and
(c) precipitating the heat-resistant resin from the coating film by means of moisturization, removal of the solvent, immersion in a solvent in which the heat-resistant resin is not dissolved, or the like, followed by, if necessary, drying.

Preferably, the coating liquid is continuously applied using a coating apparatus described in JP-A-2001-316006 by a method described in JP-A-2001-23602.

When the para-aramid is used as the heat-resistant resin in the polar organic solvent solution, a polar amide solvent and a polar urea solvent may be used as the polar organic solvent. Specific examples of these solvents include, but are not limited to, N,N-dimethyl formamide, N,N-dimethyl acetoamide, N-methyl-2-pyrrolidone (NMP), and tetramethylurea.

When the para-aramid is used as the heat-resistant resin, in order to improve the solubility of the para-aramid in a solvent, preferably an alkali metal chloride or an alkaline earth metal chloride is added to the reaction mixture during the polymerization of the para-aramid. Specific examples of the chlorides include, but are not limited to, lithium chloride and calcium chloride. The amount of the chloride added to the polymerization system is preferably within a range of not less than 0.5 mole and not more than 6.0 moles, more preferably within a range of not less than 1.0 mole and not more than 4.0 moles, per mole of amide groups formed in the course of the condensation polymerization. When the amount of the chloride is less than 0.5 mole, the resulting para-aramid may have insufficient solubility. The amount exceeding 6.0 moles may be undesirable, because the amount substantially exceeds the amount of the chloride soluble in the solvent. In general, when the amount of the alkali metal chloride or the alkaline earth metal chloride is less than 2% by weight, the para-aramid may have insufficient solubility. When it exceeds 10% by weight, the alkali metal chloride or the alkaline earth metal chloride may hardly be dissolved in the polar organic solvent such as the polar amide solvent or the polar urea solvent.

When the aromatic polyimide is used as the heat-resistant resin, dimethylsulfoxide, cresol and o-chlorophenol are preferably used as a polar organic solvent dissolving the aromatic polyimide, besides those listed as the solvent dissolving the aramid.

As the method for preparing a slurry coating liquid by dispersing the filler, a pressure type disperser such as a Gorlin homogenizer or a nanomizer may be used.

Examples of the method for applying the slurry coating liquid include knife coating, blade coating, bar coating, gravure coating and die coating. The bar or knife coating is simple and easy, while the die coating is industrially preferable because an apparatus for die coating has such a structure that the solution is not exposed to an air. The coating step may be repeated twice or more. In this case, the coating step is generally carried out after the heat-resistant resin is precipitated in the step (c).

When the heat-resistant layer and the shut-down layer are separately produced and these layers are laminated, it is preferable to fix them by means of an additive or heat-sealing.

Hereinafter, a non-aqueous electrolyte secondary battery comprising the separator of the present invention is described using a lithium ion secondary battery as an example.

The lithium ion secondary battery may be produced by any known method. For example, a battery can be produced by laminating a cathode sheet comprising a cathode collector coated with an electrode mixture for a cathode, an anode sheet comprising an anode collector coated with an electrode mixture for an anode, and the separator of the present invention and winding the laminate to give an electrode member, placing the electrode member in a container such as a battery can, and impregnating the electrode member in the container with an electrolytic solution prepared by dissolving an electrolyte in an organic solvent. The heat-resistant layer in the separator of the present invention may be brought into contact with either the cathode sheet or the anode sheet. When a pair of the heat-resistant layers are provided on the respective sides of the shut-down layer, the heat-resistant layers can be brought into contact with the cathode sheet and the anode sheet, respectively.

The electrode member has a cross section, which appears when the electrode member is cut along direction vertical to the axis of winding, in the shape of a circle, an oval, a rectangle, a rectangle the edges of which are chamfered, and the like. The battery can be of any shape such as a paper sheet, a coin, a cylinder or a box-shape.

As the cathode sheet, a sheet comprising a cathode collector coated with an electrode mixture for a cathode which comprises a cathode active material, a conductive agent and a binder is usually used. The electrode mixture for a cathode preferably comprises a material capable of doping or dedoping lithium ions as a cathode active material, a carbonaceous material as a conductive agent, and a thermoplastic resin as a binder.

Specific examples of the cathode active materials include metal composite oxides comprising at least one transition metal element selected from the group consisting of V, Mn, Fe, Co, Ni, Cr and Ti, and an alkali metal element such as Li or Na, preferably composite oxides having an $\alpha$-NaFeO$_2$ structure as a basic structure, more preferably composite oxides such as lithium cobaltate, lithium nickelate and a composite oxide wherein a part of nickel of lithium nickelate is replaced with other element such as Mn or Co, from the viewpoint of a high average discharge potential. Composite oxides having a spinel structure such as spinel lithium manganese as a basic structure may also be exemplified.

Examples of the binders include thermoplastic resins, specifically polyvinylidene fluoride, vinylidene fluoride copolymers, polytetrafluoroethylene, tetrafluoroethylene-hexafluoropropylene copolymers, tetrafluoroethylene-perfluoroalkyl vinyl ether copolymers, ethylene-tetrafluoroethylene copolymers, vinylidene fluoride-hexafluoropropylene-tetrafluoroethylene copolymers, thermoplastic polyimides, carboxymethyl cellulose, polyethylene, and polypropylene.

Examples of the conductive agents include carbonaceous materials, specifically natural graphite, artificial graphite, cokes and carbon black. They may be used as a mixture of two or more of them.

Examples of the cathode collector include aluminum and stainless steel. Aluminum is preferable because of lightweight, low cost and easy processability.

Examples of a method for coating a cathode collector with an electrode mixture for a cathode include a pressure molding method, and a method comprising the steps of forming an electrode mixture for a cathode into a paste with a solvent or the like, coating a cathode collector with the paste, and drying the paste following by pressure bonding by pressing.

As the anode sheet, a sheet comprising a collector coated with an electrode mixture for an anode which comprises a material capable of doping or dedoping lithium ions may be used. Also, a lithium metal sheet and a lithium alloy sheet may be used. Specific examples of the materials capable of doping or dedoping lithium ions include carbonaceous materials such as natural graphite, artificial graphite, cokes, carbon black, pyrolytic carbons, carbon fibers, and baked organic polymer compounds. Also, a chalcogenide such as an oxide or a sulfide capable of doping or dedoping lithium ions at a potential lower than that of the cathode may be used. Among the carbonaceous materials, a carbonaceous material comprising graphite such as natural graphite or artificial graphite as a main component is preferable, because of good potential flatness and a low average discharge potential. The carbonaceous material is in the shape of any of a flake such as natural graphite, a sphere such as mesocarbon microbead, a fiber such as graphitized carbon fiber, an aggregate of a fine powder of these materials, and the like.

When an electrode mixture for an anode including polyethylene carbonate is used in a case where the electrolytic solution does not contain ethylene carbonate which is described later, the cycle characteristic and high-current discharge characteristics of the obtained battery can be preferably improved.

The electrode mixture for an anode may optionally comprise a binder. Examples of the binders include thermoplastic resins, specifically polyvinylidene fluoride, polyvinylidene fluoride copolymers, vinylidene fluoride-hexafluoropropylene-tetrafluoroethylene copolymers, thermoplastic polyimides, carboxymethyl cellulose, polyethylene, and polypropylene.

The chalcogenide such as an oxide or a sulfide used as the material capable of doping or dedoping lithium ions contained in the electrode mixture for an anode include a crystalline or amorphous chalcogenide such as an oxide or a sulfide which comprises an element of Group 13, 14 or 15 of the Periodic Table, in particular, an amorphous chalcogenide comprising tin oxide. A carbonaceous material as a conductive agent and a thermoplastic resin as a binder may also be added thereto as necessary.

Examples of the anode collector used in the anode sheet include copper, nickel, and stainless steel. Copper is preferable, because it hardly forms an alloy with lithium, and it is easily formed into a thin film. Examples of a method for coating an anode collector with an electrode mixture for an anode include the same methods as those in the case of the cathode, that is, a pressure molding method, and a method comprising the steps of forming an electrode mixture for an anode into a paste with a solvent or the like, coating an anode collector with the paste, and drying the paste following by pressure bonding by pressing.

As the electrolytic solution, for example, an electrolytic solution comprising a lithium salt dissolved in an organic solvent may be used. Examples of the lithium salt include $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lithium salt of a lower aliphatic carboxylic acid, and $LiAlCl_4$. They may be used as a mixture of two or more of them. Among these lithium salts, it is preferable to use at least one selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, all of which comprises fluorine atoms.

Examples of the organic solvent contained in the electrolytic solution include carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acrylonitrile and butyronitrile; amides such as N,N-dimethyl formamide and N,N-dimethyl acetamide; carbamates such as 3-methyl-2-oxazolidone; sulfur-containing compounds such as sulpholane, dimethyl sulfoxide, and 1,3-propane sultone; above solvents to which a fluorine-containing substituent is introduced may be used. Usually, they are used as a mixture of two or more of them. Among them, a mixed solvent comprising a carbonate is preferable, and a mixed solvent of a cyclic carbonate and an acyclic carbonate and a mixed solvent of a cyclic carbonate and an ether are more preferable. Among the mixed solvents of the cyclic carbonate and the acyclic carbonate, a mixed solvent comprising ethylene carbonate, dimethyl carbonate or ethyl methyl carbonate is preferable, since they have a wide operating temperature range and good load characteristics, and they are hardly degraded even if the graphite material such as natural graphite or artificial graphite is used as the active material for an anode. It is preferable to use an electrolytic solution comprising a lithium salt having a fluorine atom such as $LiPF_6$, and an organic solvent having a fluorine-containing substituent, since a particularly excellent effect of improving safety can be obtained. A mixed solvent comprising dimethyl carbonate and an ether having a fluorine-containing substituent such as pentafluoropropyl methyl ether or 2,2,3,3-tetrafluoropropyl difluoromethyl ether is more preferable, because of its good high-current discharge characteristics.

When a solid electrolyte is used instead of the above-mentioned electrolytic solution, a lithium polymer secondary battery is obtained. As the solid electrolyte, for example, a polymer electrolyte such as a high molecular weight polyethylene oxide, a high molecular weight compound comprising at least one of a polyorganosiloxane chain and a polyoxyalkyene chain may be used. Also, a so-called gel-type electrolyte in which a nonaqueous electrolytic solution is impregnated in a polymer may be used. When a sulfide electrolyte such as $Li_2S$—$SiS_2$, $Li_2S$—$GeS_2$, $Li_2S$—$P_2S_5$ or $Li_2S$—$B_2S_3$, or an inorganic compound electrolyte comprising a sulfide such as $Li_2S$—$SiS_2$—$Li_3PO_4$ or $Li_2S$—$SiS_2$—$Li_2SO_4$ is used, the safety of a battery can be further improved.

Hereinafter, a capacitor comprising the separator of the present invention will be illustrated. The capacitor can be produced by a conventional method such as a method disclosed in JP-A-2000-106327.

The capacitor may include an electric double layer capacitor. The capacitor comprises electrodes, a separator and an electrolytic solution, and the electrolyte dissolved in the electrolytic solution is absorbed by the electrodes, so that the electric energy is stored in an interface (an electric double layer) formed between the electrolyte and each electrode.

As the electrode for the capacitor, carbonaceous materials such as activated carbon black, and polyacene may be used. In general, activated carbon having fine pores including mainly micropores (with a pore diameter of usually 20 Å or less), which is prepared by carbonizing a raw material such as coconut shell and activating it, is used. The whole pore volume of the activated carbon is usually less than 0.95 ml/g, preferably not less than 0.5 ml/g and not more than 0.93 ml/g. The whole pore volume of not less than 0.95 ml/g is preferable, because the electric capacity per unit volume increases. The activated carbon is usually pulverized to particles with an average particle size of 50 μm or less, preferably 30 μm or less, particularly 10 μm or less. The bulk density of the electrode can be increased and the internal resistance can be lowered by finely pulverizing the activated carbon.

Activated carbon containing few metal components such as alkali metals and alkaline earth metals, in other words, having a metal content of 100 ppm or less is preferably used as an electrode material, because such activated carbon induces no polarization due to the metal components, and it forms a number of electric double layers. Generally, the electrode further comprises a binder, a conductive agent, and the like, for easy formation of the electrode.

For producing an electrode, generally, a mixture containing activated carbon, a binder, a conductive agent, and the like is formed on a collector. Examples of a method for producing an electrode include a method comprising coating a collector with a mixed slurry prepared by adding a solvent to activated carbon, a binder, a conductive agent, and the like by a doctor blade method or the like, or immersing a collector in the mixed slurry, and drying the coated collector; a method comprising adding activated carbon, a binder, a conductive agent, and the like to a solvent, kneading the mixture, forming and drying the mixture to give a sheet, bonding the resulting sheet to the collector surface with a conductive adhesive or the like, and pressing a laminate of the sheet and the collector, followed by heat-treatment and drying; a method forming a mixture containing activated carbon, a binder, a conductive agent, a liquid lubricant, and the like on a collector, removing the liquid lubricant from the mixture, and then uniaxially or multi-axially stretching the resulting molded sheet; and so on. When the electrode is in the form of a sheet, its thickness is from about 50 to 1000 μm.

The material of a collector used in the electrode for the capacitor may include, for example, metals such as nickel, aluminum, titanium, copper, gold, silver, platinum, aluminum alloy, and stainless steel; a sheet formed by plasma spraying or arc spraying of nickel, aluminum, zinc, copper, tin, lead or alloys thereof on a carbonaceous material or an activated carbon fiber; conductive films comprising a conductive agent dispersed in a rubber or a resin such as a styrene-butylene-styrene copolymer (SEBS); and the like. Aluminum is particularly preferable, because it is lightweight, has excellent electric conductivity, and is electrochemically stable.

Examples of the conductive agent used in the electrode for the capacitor include conductive carbon such as graphite, carbon black, acetylene black, Ketchen black, and activated carbon different from one of the present invention; graphite conductive agents such as natural graphite, thermally expandable graphite, flaky graphite, and expandable graphite; carbon fibers such as vapor-grown carbon fiber; fine particles or fibers of a metal such as aluminum, nickel, copper, silver, gold, or platinum; conductive metal oxides such as ruthenium oxide or titanium oxide; and conductive polymers such as polyaniline, polypyrrole, polytiophene, polyacetylene, and polyacene. Carbon black, acetylene black and Ketchen black are particularly preferable, because the conductivity is effectively improved even if they are used in a small amount. The amount of the conductive agent contained in the electrode is usually from about 5 to 50 parts by weight, preferably from about 10 to 30 parts by weight, per 100 parts by weight of the activated carbon in the present invention.

The binder used in the electrode for the capacitor may be a polymer of a fluorine compound, and examples of the fluorine compound include fluorinated $C_1$-$C_{18}$-alkyl(meth)acrylates, perfluoroalkyl(meth)acrylates, perfluoroalkyl-substituted alkyl(meth)acrylates, perfluoroxyalkyl(meth)acrylates, fluorinated $C_1$-$C_{18}$-alkyl crotonate, fluorinated $C_1$-$C_{18}$-alkyl malates and fumarates, fluorinated $C_1$-$C_{18}$-alkyl itaconate, fluorinated alkyl-substituted olefins having about 2 to 10 carbon atoms and about 1 to 17 fluorine atoms, tetrafluoroethylene, trifluoroethylene, vinylidene fluoride, hexafluoropropylene, and the like. Apart from these compounds, addition polymers of monomers having an ethylenic double bond with no fluorine atom, polysaccharides such as starch, methyl cellulose, carboxymethyl cellulose, hydroxymethyl cellulose, hydroxyethyl cellulose, hydroxypropyl cellulose, carboxymethyl hydroxyethyl cellulose, nitrocellulose, and derivatives thereof; pheynol resins; melamine resins; polyurethane resins; urea resins; polyimide resins; polyamideimide resins; petroleum pitch; coal pitch; and the like. Among them, the polymers of a fluorine compound are preferable, and polytetrafluoroetylene, which is a polymer of tetrafluoroethylene, is particularly preferable as the binder. A plural kinds of the binders may be used as the binders. The amount of the binder used in the electrode is usually from about 0.5 to 30 parts by weight, preferably from about 2 to 30 parts by weight, per 100 parts by weight of the activated carbon.

The electrolytes dissolved in the electrolytic solution for the capacitor are roughly divided into inorganic electrolytes and organic electrolytes. Examples of the inorganic electrolyte include acids such as sulfuric acid, hydrochloric acid and perchloric acid; bases such as sodium hydroxide, potassium hydroxide, lithium hydroxide and tetraalkylammonium hydroxides; salts such as sodium chloride and sodium sulfate, and the like. Among them, an aqueous sulfuric acid solution is preferable as the inorganic electrolyte, because it has good stability and a low corrosive property against materials constituting the electric double layer capacitors. The concentration of the inorganic electrolyte is usually from about 0.2 to 5 moles of electrolyte per liter of an electrolytic solution, preferably from about 1 to 2 moles of electrolyte per liter of an electrolytic solution. When the concentration is from 0.2 to 5 moles/L, the ion conductivity in the electrolytic solution can be secured. The inorganic electrolyte is usually mixed with water and used in the form of an electrolytic solution.

Examples of the organic electrolyte include combinations of an inorganic anion such as $BO_3^{3-}$, $F^-$, $PF_6^-$, $BF_4^-$, $AsF_6^-$, $SbF_6^-$, $ClO_4^-$, $AlF_4^-$, $AlCl_4^-$, $TaF_6^-$, $NbF_6^-$, $SiF_6^{2-}$, $CN^-$ or $F(HF)_n^-$ wherein n is a number of not less than 1 and not more than 4, and an organic cation described below; combinations of an organic anion and an organic cation, which are described below; combinations of an organic anion and an inorganic cation such as lithium ion, sodium ion, potassium ion, or hydrogen ion. The organic cation is a cationic organic compound, and examples thereof include organic quaternary ammonium cation, organic quaternary phosphonium cation, and the like. The organic quaternary ammonium cation is a quaternary ammonium cation in which a hydrocarbon group selected from the group consisting of a $C_1$-$C_{20}$-alkyl group, a $C_6$-$C_{20}$-cycloalkyl group, a $C_6$-$C_{20}$-aryl group, and a $C_7$-$C_{20}$-aralkyl group is substituted with a nitrogen atom. The organic quaternary phosphonium cation is a quaternary phosphonium cation in which the same hydrocarbon group as above is substituted by a phosphor atom. To the hydrocarbon group, a hydroxyl group, an amino group, a nitro group, a cyano group, a carboxyl group, an ether group, an aldehyde group, or the like may be bonded. As the organic cation, the organic quaternary ammonium cation is preferable, and an imidazolium cation is preferable. 1-Ethyl-3-methyl imidazolium ($EMI^+$) is particularly preferable, because the electric capacity per unit volume tends to increase.

The organic anion is an anion having a hydrocarbon group which may have a substituent, and examples thereof include an anion selected from the group consisting of $N(SO_2R_f)_2^-$, $C(SO_2R_f)_3^-$, $R_fCOO^-$ and $R_fSO^{3-}$ wherein $R_f$ is a perfluoroalkyl group having 1 to 12 carbon atoms; and an anion in which an active hydrogen atom is removed from an organic acid such as a carboxylic acid, an organic sulfonic acid and an organic phosphoric acid, or phenol. As the anions, the inorganic anions are preferable, and $BF_4^-$, $AsF_6^-$ and $SbF_6^-$ are particularly preferable, and $BF_4^-$ is particularly preferable, because the electric capacity tends to increase.

The organic polar solvent contained in the electrolytic solution is a solvent containing, as a main component, at least one compound selected from the group consisting of carbonates, lactones and sulfoxides, and preferably, a solvent containing, as a main component, at least one compound selected from the group consisting of propylene carbonate, ethylene carbonate, butylene carbonate, sulfolane, 3-methylsulfolane, acetonitrile, dimethyl carbonate, ethyl methyl carbonate, γ-butyrolactone, ethylene glycol and diethyl carbonate. A solvent containing, as a main component, at least one compound selected from the group consisting of ethylene carbonate, propylen carbonate, γ-butyrolactone and sulfolane is particularly preferable. Herein, the phrase "containing as a main component" is intended to mean that a specific the compound is contained in a solvent in an amount of at least 50% by weight, preferably at least 70% by weight. The larger amount of the organic polar solvent can more improves the long-time durability and the operating voltage of the capacitor. The organic polar solvent which dissolves the electrolyte may be a mixed solvent of two or more solvents.

Examples of a method for producing a capacitor using the electrodes and the electrolytic solution for the capacitor, and the separator of the present invention include a method comprising winding a pair of electrode sheets with inserting a separator between them to form an electrode member, immersing the electrode member in an electrolytic solution, and placing it in a closed-end cylindrical case; and a method comprising alternately laminating rectangle electrodes and rectangle separators to form an electrode member, immersing the electrode member in an electrolytic solution, and placing it in a closed-end square shape case.

Hereinafter, the present invention will be explained in more detail by the following examples. The evaluation of separators, and the production and evaluations of non-aqueous electrolyte secondary batteries having a separator were performed as follows.

Evaluations of Separator (1) Measurement of Thickness

The thicknesses of a separator and a shut-down layer were measured in accordance with JIS K 7130-1992. The thickness of a heat-resistant layer was obtained by subtracting the thickness of the shut-down layer from the thickness of the separator.

(2) Measurement of Gas Permeability by Gurley Method

The gas permeability of a separator was measured using a Gurley densometer with a digital timer manufactured by Yasuda Seiki Seisakusho Ltd. in accordance with JIS P 8117.

(3) Porosity

The obtained porous film was cut into a square sample (10 cm×10 cm), and the weight W (g) and the thickness D (cm) of the sample were measured. The weight (Wi) of each layer in the sample was measured, the volume of each layer was calculated from Wi and the absolute specific gravity (g/cm$^3$) of the material of each layer. Then, the porosity (% by volume) was calculated by the following equation:

Porosity (% by volume)=$100 \times \{1-(W1/\text{Absolute Specific Gravity 1}+W2/\text{Absolute Specific Gravity 2}+\ldots+Wn/\text{Absolute Specific Gravity }n)/(10 \times 10 \times D)\}$ Production and Evaluation of Non-Aqueous Electrolyte Secondary Battery Having Separator (1) Production of Cathode Sheet Carboxymethylcellulose, polytetrafluoroethylene, acetylene black, and a lithium cobaltate powder as a cathode active material were dispersed in water and the mixture was kneaded to prepare a paste of an electrode mixture for a cathode. The weight ratio of the components contained in this paste, that is, the weight ratio of carboxymethylcellulose:polytetrafluoroethylene:acetylene black:lithium cobaltate powder:water was 0.75:4.55:2.7:92:45. The paste was applied to both sides of a cathode collector made of an aluminum foil having a thickness of 20 μm in predefined surface regions, and the obtained product was dried, roll-pressed, and slit to obtain a cathode sheet. The surface region of the aluminum foil having no applied electrode mixture for a cathode had a length of 1.5 cm, and an aluminum lead was resistance-welded to the uncoated region.

(2) Production of Anode Sheet

Carboxymethylcellulose, natural graphite and artificial graphite were dispersed in water and the mixture was kneaded to prepare a paste of an electrode mixture for an anode. The weight ratio of the components contained in this paste, that is, the weight ratio of carboxymethyl cellulose:natural graphite:artificial graphite:water was 2.0:58.8:39.2:122.8. The paste was applied to the both sides of an anode collector made of a copper foil having a thickness of 12 μm in predefined surface regions, and the obtained product was dried, roll-pressed and slit, thereby obtaining an anode sheet. The surface region of the copper foil having no applied electrode mixture for an anode had a length of 1.5 cm, and a nickel lead was resistance-welded to the uncoated region.

(3) Production of Cylindrical Battery

A separator, the cathode sheet, the anode sheet (length of a surface region having no applied electrode mixture for an anode: 30 cm) were laminated in the order of the cathode sheet, the separator and the anode sheet so that the part of the anode sheet with a surface region having no applied electrode mixture for an anode constituted the outermost layer. Then, the laminate was wound from its one end to form an electrode member. The electrode member was inserted in a battery can and then impregnated with an electrolytic solution comprising $LiPF_6$ dissolved in a mixed liquid of ethylene carbonate, dimethyl carbonate and ethyl methyl carbonate at a volume ratio of 16:10:74 in a concentration of 1 mole/liter. The can was sealed via a gasket with a battery lid, which also acted as a positive terminal to obtain a 18650 cylindrical battery (non-aqueous electrolyte secondary battery). The layers were laminated so that the heat-resistant layer in the separator was brought into contact with the cathode sheet, and the shut-down layer in the separator was brought into contact with the anode sheet.

(4) Evaluation of Charge-Discharge Performance of Cylindrical Battery

The cylindrical battery produced as described above was charged to 50% and then aged by maintaining the battery at 60° C. for 15 hours. Then, a rate characteristic (high-current discharge characteristic) and a cycle characteristic of the battery were evaluated under the following evaluation conditions. As an electric capacity, a capacity upon the first discharge (the battery being charged under conditions of a maximum charge voltage of 4.3 V, a charge time of 3 hours and a charge current of 1 C, and discharged under conditions of a minimum discharge voltage of 3.0 V and a discharge current of 0.2 C) was used.

<Evaluation of Rate Characteristic>

The battery was charged under charge conditions of a maximum charge voltage of 4.3 V, a charge time of 3 hours, and a charge current of 1 C, and discharged under discharge conditions of a minimum discharge voltage of 3.0 V, and a discharge current of 0.2 C, 1 C or 2 C. The battery was charged under the charge conditions described above, prior to each discharge test.

<Cycle Characteristic>

The battery was charged under charge conditions of a maximum charge voltage of 4.3 V, a charge time of 3 hours and a charge current of 1 C, and discharged under discharge conditions of a minimum discharge voltage of 3.0 V and a discharge current of 1 C. The charge and discharge was repeated 200 times.

EXAMPLE 1

(1) Preparation of Coating Liquid

In 4200 g of NMP, 272.7 g of calcium chloride was dissolved, and then 132.9 g of para-phenylenediamine was added and completely dissolved therein. To the resulting solution, 243.3 g of terephthalic acid dichloride (hereinafter referred to as TPC) was gradually added to perform polymerization, whereby a para-aramid was obtained. The reaction mixture was diluted with NMP to obtain a para-aramid solution (A) having a concentration of 2.0% by weight. With 100 g of the obtained para-aramid solution, 2 g of alumina powder (a) (Alumina C manufactured by Nippon Aerosil Co., Ltd.; an average particle size: 0.02 µm (corresponding to $D_2$); substantially spherical particles; aspect ratio of particles: 1) and 2 g of alumina powder (b) (Sumicorundum AA03 manufactured by Sumitomo Chemical Co., Ltd.; an average particle size: 0.3 µm (corresponding to $D_1$); substantially spherical particles; aspect ratio of particles: 1) were mixed in a total amount of 4 g as fillers, and the mixture was treated with a nanomizer three times, filtered through a 1000-mesh metallic mesh, and degassed under reduced pressure to prepare a slurry coating liquid (B). The amount of the alumina powders (fillers) was 67% by weight based on the total weight of the para-aramid and the alumina powders. $D_2/D_1$ was 0.07.

(2) Production and Evaluation of Separator

As a shut-down layer, a polyethylene porous film (thickness: 12 µm, gas permeability: 140 sec./100 cc, average pore size: 0.1 µm, porosity: 50%) was used. The polyethylene porous film was fixed onto a 100 µm-thick PET film, and the porous film was coated with the slurry coating liquid (B) using a bar coater manufactured by Tester Sangyo Co., Ltd. The integral laminate of the coated porous film and the PET film was immersed in water as a poor solvent to deposit a para-aramid porous film (a heat-resistant layer), and then the solvent was removed to obtain a separator 1 consisting of the laminate of the heat-resistant layer and the shut-down layer. The separator 1 had a thickness of 16 µm, and the para-aramid porous film (heat-resistant layer) had a thickness of 4 µm. The separator 1 had a gas permeability of 180 sec./100 cc and a porosity of 50%. It was found that relatively small micropores having a pore size of about 0.03 µm to 0.06 µm and relatively large micropores having a pore size of about 0.1 µm to 1 µm were present, when the cross section of the heat-resistant layer of the separator 1 was observed with a scanning electron microscope (SEM).

(3) Evaluation of Non-Aqueous Electrolyte Secondary Battery

The cylindrical battery was prepared using the separator 1 in the above-mentioned manner, and its electric capacity was evaluated. As a result, the electric capacity was as high as 2000 mAh. The evaluation of the rate characteristic revealed that the ratio of the capacitance upon 2 C discharge to that upon 0.2 C discharge (2 C/0.2 C) was 90%. The evaluation of the cycle characteristic revealed that the ratio of the capacitance upon the 200th discharge to that upon the first discharge (200th/first) was 95%.

COMPARATIVE EXAMPLE 1

A separator 2 was prepared in the same manner as in Example 1 except that 4 g of alumina powder (a) (Alumina C manufactured by Nippon Aerosil Co., Ltd.; average particle size: 0.02 µm) was used alone as the filler. The separator 2 had a thickness of 16 µm, and the para-aramid porous film (the heat-resistant layer) had a thickness of 4 µm. The separator 2 had a gas permeability of 200 sec./100 cc, and a porosity of 50%. It was found that pores having a pore size of about 0.03 µm to 0.06 µm were formed on the surface of the heat-resistant layer in the separator 2, when the surface was observed with a scanning electron microscope (SEM).

A cylindrical battery was produced using the separator 2 in the above-mentioned manner, and its electric capacity was evaluated. As a result, the electric capacity was 2000 mAh. The evaluation of the rate characteristic revealed that the ratio of the capacitance upon 2 C discharge to that upon 0.2 C discharge (2 C/0.2 C) was 75%. The evaluation of the cycle characteristic revealed that the ratio of the capacitance upon the 200th discharge to that upon the first discharge (200th/first) was 90%.

COMPARATIVE EXAMPLE 2

A separator 3 was prepared in the same manner as in Example 1, except that 4 g of alumina powder (b) (Sumicorundum AA03 manufactured by Sumitomo Chemical Co., Ltd.; average particle size: 0.3 µm) was used alone as the filler in Example 1. The separator 3 had a thickness of 16 µm, and the para-aramid porous film (heat-resistant layer) had a thickness of 4 µm. The separator 3 had a gas permeability of 180 sec./100 cc, and a porosity of 50%. It was found that pores having a pore size of about 0.03 μm to 0.1 μm were formed on the surface of the heat-resistant layer in the separator 3 when the surface was observed with a scanning electron microscope (SEM).

A cylindrical battery was produced using the separator 3 in the above-mentioned manner, and its electric capacity was evaluated. As a result, the electric capacity was 2000 mAh. The evaluation of the rate characteristic revealed that the ratio of the capacitance upon 2 C discharge to that upon 0.2 C discharge (2 C/0.2 C) was 80%. The evaluation of the cycle characteristic revealed that the ratio of the capacitance upon the 200th discharge to that upon the first discharge (200th/first) was 90%.

The invention claimed is:

1. A separator made of a laminated porous film in which a heat-resistant layer that comprises a heat-resistant resin selected from the group consisting of polyamides, polyimides, polyamideimides, polycarbonates, polyacetals, polysulfones, polyphenylene sulfides, polyether ether ketones, aromatic polyesters, polyether sulfones and polyetherimides and a shut-down layer that comprises a thermoplastic resin are laminated, wherein the heat-resistant layer further comprises two or more fillers, and the value of $D_2/D_1$ is 0.15 or less where among values each obtained by measuring the average particle diameter of particles that constitute one of the two or more fillers, the largest value is let be $D_1$ and the second largest value is let be $D_2$, wherein a ratio of a weight of the filler consisting of the particles with the average particle size of $D_1$ to a weight of the filler consisting of the particles with the average particle size of $D_2$ is from 30:70 to 70:30, when the whole weight of the fillers is 100.

2. The separator according to claim 1, wherein the heat-resistant layer has a thickness of not less than 1 μm and not more than 10 μm.

3. The separator according to claim 1, wherein when the weight of all the fillers is let be 100, the weight of the filler that is constituted of the particles having an average particle size of $D_1$ and the weight of the filler that is constituted of the particles having an average particle size of $D_2$ is 90 or more.

4. The separator according to claim 1, wherein $D_1$ is not less than 0.1 μm, and $D_2$ is less than 0.1 μm.

5. The separator according to claim 1, wherein $D_1$ is not more than 10 μm.

6. The separator according to claim 4, wherein $D_1$ is not less than 0.1 μm and not more than 1 μm, and $D_2$ is not less than 0.01 μm and less than 0.1 μm.

7. The separator according to claim 1, wherein all the particles constituting the fillers are alumina particles.

8. The separator according to claim 1, wherein a part or all of the particles constituting the fillers are approximately spherical particles.

9. The separator according to claim 7, wherein when the overall weight of the heat-resistant layer is let be 100, the weight of the fillers is not less than 20 and not more than 95.

10. The separator according to claim 1, wherein when the thickness of the heat-resistant layer is let be A (μm) and the thickness of the shut-down layer is let be B (μm), the ratio of A/B is not less than 0.1 and not more than 1.

11. The separator according to claim 1, wherein the heat-resistant resin is a nitrogen-containing aromatic polymer.

12. The separator according to claim 1, wherein the thermoplastic resin is polyethylene.

13. The separator according to claim 1, wherein a heat-resistant layer is provided on faces of the shut-down layer.

14. The porous film according to claim 7, wherein a weight of the fillers is not less than 30 and not more than 90, when a whole weight of the heat-resistant layer is let be 100.

* * * * *